United States Patent Office 3,098,051
Patented July 16, 1963

3,098,051
ADDUCT OF AN ANHYDRIDE OF AN AROMATIC POLYBASIC ACID AND A FATTY ACID ESTER
Joseph Z. Matt, Chicago, Ill., assignor, by mesne assignments, to Reichhold Chemicals, Inc., White Plains, N.Y., a corporation of Delaware
No Drawing. Filed Aug. 13, 1958, Ser. No. 754,719
19 Claims. (Cl. 260—21)

The object of the present invention is the production of new and valuable polybasic acids, which are easily made, are low in cost, and by virtue of polyfunctionality are capable of undergoing a variety of transformations. A further object is the production of useful derivatives of these acids, of value as precursors of materials such as resins, protective coatings and film-formers, surfactants, bactericides, plasticizers, greases, and intermediates.

The acids are derived by reacting actual or potential polyhydroxy compounds such as castor oil, hydrogenated castor oil, polyoxyethylated or polyoxypropylated castor oil, glyceryl ricinoleates, glycol ricinoleates, pentaerythritol ricinoleates, ricinoleates of other polyols, hydroxylated oils and epoxidized oils, with anhydrides of polybasic acids which contain at least three carboxyl groups per mol and includes trimellitic anhydride and pyromellitic monoanhydride, pyromellitic dianhydride and the maleic anhydride adducts of unsaturated acids. The anhydride groups of such acids react readily under mild conditions with an alcoholic hydroxyl group carried by the above referred to polyhydroxy compounds. Alternately, the epoxy group of an epoxidized oil will open to give an hydroxy ester when reaction occurs with a free acid group of trimellitic and pyromellitic anhydrides, and other polybasic acids, such as citric acid, the maleic anhydride adduct of abietic acid and the maleic anhydride adduct of unsaturated fatty acid. General structures for such adducts are designated as follows,

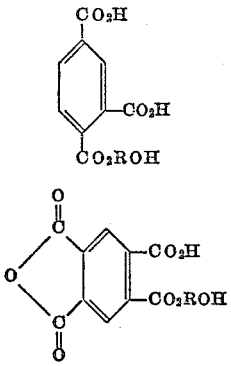

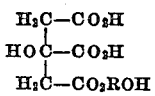

where R is the residue of the polyhydroxy compound.

Free carboxyl groups remain present in the reaction products. As many as nine acidic functions results from the reaction of three moles of pyromellitic dianhydride and a castor oil molecule, and up to six acidic functions result from the trimellitic anhydride castor oil reaction. It is now disclosed that the adducts can be converted to water-soluble forms by neutralization of the acidic groups with alkali metal hydroxides, alkali oxides and alkali carbonates, ammonia and amines, and by esterification of the carboxyls with polyethylene glycols, polypropylene glycols, and the polyglycols derived from mixtures of ethylene oxide and propylene oxide. Ethylene oxide, propylene oxide, and mixtures of these also give the polyglycol esters of the adducts. Surprisingly, in contrast, the use of phthalic anhydride instead of pyromellitic or trimellitic anhydrides results in products which are not rendered water-soluble by common amines, although such reaction products have three free acid groups. This fact can be explained with a calculation which shows that tris adducts of castor oil with pyromellitic, trimellitic and phthalic anhydrides, have, respectively, 9.6, 14, and 27 carbons to be carried into solution by each amine group. Thus, the weight of carbon to be solubilized in a triphthalate is beyond the capacity of amine salt groupings.

The following are typical adducts obtainable upon reaction of the hydroxy-containing oils with the aforementioned acid anhydrides:

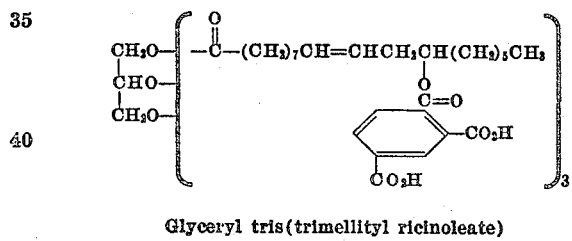

Glyceryl tris(trimellityl ricinoleate)

Glyceryl mono(pyromellityl ricinoleate)

Bis(ethylene glycol monoricinoleyl)pyromellitate

Reaction products possessing valuable properties as chemical intermediates may be obtained from polyols without adding the maximum theoretical amounts of anhydrides. Thus, castor oil can yield mono, di and triadducts of trimellitic anhydride, and pentaerythritol tetraricinoleate can react with from one to 4 moles of anhydride.

The solubilization of the long chains gives rise to surface-active materials which are soluble both in water and in organic solvents and other organic materials. Thus, the polyoxyethylene esters are of utility as detergent, wetting, emulsifying, and flotation agents. Alkali metal salts and amine salts yield products useful in detergent, bactericidal and fungicidal applications. In addition to the basic materials referred to above, polyamines are also of value in neutralizing the acid function and result in the formation of water-soluble products. When the polybasic acids described above are only partly esterified with a polyglycol, there may result a water-soluble product, still containing free carboxyl and free hydroxyl groups. Such groupings are capable of reacting during a baking process to give insoluble cross-linked products in the form of a coating film having high resistance to water. As a result of my invention, it is thus possible to prepare water-soluble products, coat them from water solution, and thereafter convert same to water-insoluble coatings.

When there is sufficient unsaturation in the products, the addition of driers will cause oxidation and hardening to insoluble, infusible forms, suitable for films or coatings.

The new polyacidic materials of my invention cited above may be cross-linked by reaction with suitable polyfunctional amines, among which are ethylene diamine, tetraethylene pentamine, and tris (dimethylaminomethyl) phenol. Tris (dimethylaminomethyl) phenol produces combinations of amine salts of the acid adducts and phenol-formaldehyde resins. The polyglycol esters of the adducts may be hardened by dialdehydes such as glyoxal, and alternatively by water-soluble urea-formaldehyde and melamine-formaldehyde resins, and when desirable, by acid anhydrides.

The hardenable water-soluble compounds thus disclosed herein as part of the specification have great utility in the field of protective coatings. The use of my system involves water as a solvent and thus makes unnecessary the use of flammable, expensive, toxic organic solvents, with their concomitant requirements of anti-sparking equipment and ventilation. In addition, the products of the present invention are water-solutions, not emulsions. The solutions are more stable to the forces of heat and shear than aqueous resin emulsions in common use today.

The method of preparing the adducts of the hydroxy compounds and the anhydrides is straight-forward. The raw materials are converted to the new products by the simple process of fusion, or heating in solvent. Temperatures from 75° to 400° F. may be used. There is little likelihood of esterification occurring between carboxyl and alcohol groups before the opening of anhydride groups by the alcohol. Therefore, determination of the acid number is a suitable means of following the course of reaction. Trimellitic anhydride will have one-third of its acidity neutralized during the formation of the adduct. Pyromellitic anhydride will have one-fourth neutralized if one anhydride group reacts, and one-half if two react. At the desired point, heating is discontinued.

The following examples illustrate but do not limit my invention.

All temperatures listed are Fahrenheit.

EXAMPLE I

*Castor Oil Mono-Trimellitate*

Trimellitic anhydride (192 g., 3 eqs.) and castor oil (1031 g., 3 eqs.) were stirred and heated to 325° in an inert atmosphere till an acid number of 91.7 was attained, 66.6% of the starting value. The resulting oil, after filtering, had a color of 5 (Gardner) and a viscosity of $Z_4$–$Z_5$ (Gardner-Holdt), and was insoluble in water. Castor oil mono-trimellitate (compound I) was thus produced.

EXAMPLE II

*Triethylamine Salt of Compound I*

Castor oil mono-trimellitate (81.7 g., 133.5 m. eq.), produced in Example I, and triethylamine (13.5 g., 133.5 m. eq.) and water (95 g.) were heated under reflux for 1 hour. The resulting solution had a color of 8 (Gardner) and a viscosity greater than $Z_6$ (Gardner-Holdt). Driers were added (0.2% Pb and 0.02% Co, as metal) and a 0.3 mil film was drawn on glass. Baked at 400° F. for 30 minutes, it gave a tack-free, clear, brown, soft film, suitable for use as a coating.

EXAMPLE III

*Polyethylene Glycol 600 Ester of Compound I*

Castor oil monotrimellitate (200 g., 3.27 eqs.) the product of Example I, was heated at 420° F. in an atmosphere of carbon dioxide with polyethylene glycol 600 (196.7 g., 3.27 eq.) till the acid number was below 5 and the Gardner-Holdt viscosity was above $Z_6$. The product was an oil, slowly soluble in water. A 20% solution had a viscosity of $Z_4$. With addition of 0.04% Co and 0.2% Pb driers (as metal), baking at 400° F. for 30 min. gave a clear amber film.

EXAMPLE IV

*Glyceryl Mono (Trimellityl Ricinoleate) as Compound II*

Glyceryl monoricinoleate (1000 g., 6060 m. eq. of hydroxyl) and trimellitic anhydride (388 g., 2020 me. of anhydride) were heated at 300° F. till the acid number was reduced to 163, 66% of the initial value, indicating opening of the anhydride by the hydroxy group. The product was an amber oil, with viscosity above $Z_6$ (Gardner-Holdt, 77° F.).

EXAMPLE V

*Triethylamine Salt of Compound II*

Glyceryl mono (trimellityl ricinoleate) (200 g., 500 m. eq.) and water were warmed and stirred. Triethylamine (50.6 g., 500 m. eq.) was added to the cooled suspension, and the mixture was stirred under reflux. The 50% solution had a viscosity of R–S (Gardner-Holdt (77° F.) and a color of 4. The addition of 0.02% cobalt and 0.2% lead as driers gave a solution which on baking at 400° for 10 min. gave a clear, hard tack-free film on glass.

EXAMPLE VI

*Pentaerythritol Ricinoleate Tris (Trimellityl Ricinoleate) as Compound III and Triethylamine Salt Thereof*

Trimellitic anhydride (113.6 g., 592 m. eq.) and pentaerythrityl tetraricinoleate (266.6 g. 789 m. eq. of hydroxyl) were heated at 320° F. with stirring in an inert atmosphere till substantially all of the anhydride had reacted, as shown by reduction of the acid number to 185, 66.6% of its original value. The hot amber liquid was filtered free of white particles and allowed to cool to a tacky solid.

Seventy-five grams (250 m. eq.) of the above product was heated under reflux with a solution of 25 g. (250 m. eq.) of triethylamine in 200 g. of water. The 33% solids solution had a viscosity of A. Driers were added (0.04% cobalt and 0.2% lead as metals) and the solution was baked at 400° F. for 20 min. An 0.3 mil film on glass had a Sward hardness of 18, and a similar film on tinplate passed 60% elongation on the G.E. testmeter. The film showed good resistance to water.

EXAMPLE VII

*Castor Oil Tris(Trimellitate) as Compound IV*

Castor oil (1500.0 g., 4.36 eq. OH) and trimellitic anhydride (837 g., 4.36 moles) were heated to 300–335° till the acid number reached 207 (66.6% of the starting value). The product was a light-brown, thermoplastic solid.

EXAMPLE VIII

*Polyethylene Glycol 400 Ester of Product of Example VII as Compound V and Curing Thereof*

Castor oil tris (trimellitate) (200 g., 738 m. eq.) and polyethylene glycol 400 (295 g., 738 m. eq.) were heated with 0.5 g. of triphenyl phosphite at 430° till an acid number of 18.5 was attained. The tan oil had a viscosity of $Z_6$ (Gardner-Holdt). This material did not cure when baked at 400° for 30 min. in the presence of driers.

Ten percent by weight of Resimene 840, a melamine-formaldehyde resin by Monsanto Chemical Company of St. Louis, Missouri, was added with water to give a 40% solution. On baking at 400° for 20 minutes, a clear, amber, film was formed on glass, with a Sward hardness of 12.

EXAMPLE IX

*Ethylene Glycol Monoricinoleate Bis Trimellitate as Compound VI*

Ethylene glycol monoricinoleate (1000 g., 4.810 eq. of OH) and trimellitic anhydride (924 g., 4.81 moles) were heated together at 320° till the acid number was reduced from 420 to 280. The filtered hot reaction product cooled to a brown thermoplastic solid.

EXAMPLE X

*Polyethylene Glycol 400 Monoricinoleate Bis Trimellitate as Compound VII*

Polyethylene glycol 400 ricinoleate (340 g., 1 eq. OH) and trimellitic anhydride (192 g., 1 mole) were heated in an inert atmosphere at 320° till the acid number fell from 316 to 211. The product on cooling was a brown solid.

EXAMPLE XI

*Castor Oil Pyromellitate as Compound VIII*

Castor oil (515 g., 1.5 eq. OH) and pyromellitic dianhydride (82 g., 0.375 mole, 0.75 eq. anhydride) were heated to 340° at which temperature solution occurred. When the acid number fell to 70, half its original value, the product was filtered. It was a tan solid at room temperature.

EXAMPLE XII

*Polyethylene Glycol 600 Ester of Castor Oil Pyromellitate as Compound IX*

Polyethylene glycol 600 (90 g., 150 m. eq.) and castor oil pyromellitate (120 g., 150 m. eq.) were heated with 0.2 g. of triphenyl phosphite at 400° in an inert atmosphere till an acid number of 26 was attained. A 35% aqueous solution of the brown viscous product had a viscosity of F (Gardner-Holdt). This could be cured by baking a 0.3 mil film on glass at 400° F. for 30 minutes, giving an amber film with a Sward hardness of 12.

EXAMPLE XIII

*Tris(Dimethylaminomethyl)Phenol Salt of Product of Example XII as Compound X and Curing Thereof*

Fifty grams (8.1 m. eq.) of a 35% solution of the polyethylene glycol 600 ester of castor oil pyromellitate was mixed with tris(dimethylaminomethyl) phenol (0.718 g., 8.1 m. eq.). The viscosity of the resulting salt solution was C (Gardner-Holdt). Driers (0.04% Co, 0.2% Pb as metals) were added and a 0.3 mil film was baked on glass at 400° for 30 minutes. The amber film had a Sward hardness of 10.

EXAMPLE XIV

*Castor Oil Triphthalate as Compound XI*

Castor oil (1500 g., 4.36 eq. of OH) and phthalic anhydride (645 g., 4.36 moles) were heated to 300° F. in an inert atmosphere till the acid number was reduced to 117, 51.5% of its initial value. The oil obtained gradually thickened to a white semi-solid material.

EXAMPLE XV

*Triethanolamine Salt of Product of Example XIV as Compound XII*

Triethanolamine (9.4 g., 62.9 m. eq.) and castor oil triphthalate (30 g., 62.7 m. eq.) were heated with water (39.4 g.) till a homogeneous suspension was obtained. This turbid, thick material was not brought into solution readily even at concentrations as low as 20%.

Thus, even by using such a hydrophilic amine as triethanolamine, I have not been able to solubilize castor oil triphthalate.

EXAMPLE XVI

*Polyethylene Glycol 600 Ester of Castor Oil Triphthalate as Compound XIII Curing Thereof*

Castor oil triphthalate (175 g., 366 m. eq.) and polyethylene glycol 600 (220 g., 366 m. eq.) were heated in the presence of 0.3 g. of triphenyl phosphite at 400° F. in an atmosphere of $CO_2$ till the acid number was reduced to less than 3. It had a viscosity of $Z_1$ at 50% solids in water. Upon addition of 0.04% cobalt and 0.2% lead, as metals, to the 50% aqueous solution, and baking at 400° for 30 minutes, the film deposited remained tacky.

Addition of 20% by weight (dry basis) of Resimene 840, a melamine-formaldehyde resin, to the above solution, and baking on glass at 400° F. for 20 minutes, gave a clear, amber film with a Sward hardness of 14.

EXAMPLE XVII

*Epoxidized Soyabean Oil Trimellitate as Compound XIV*

Trimellitic anhydride (23.2 g., 0.121 mole) was heated to 250° with epoxidized soyabean oil (365 g., 0.181 eq. of epoxy). The mixture rapidly increased in viscosity from C–D to $Z_4$–$Z_5$ (Gardner-Holdt, 77° F.) and the acid number decreased from 52.5 to 31.8. The color of the oily product was 3 (Gardner, 1933). This is believed to be the adduct of two trimellitic anhydride molecules with one of epoxidized soyabean oil, the epoxide rings having been opened to form hydroxy esters.

What I claim is:

1. The adduct of an anhydride group of an anhydride of an aromatic polybasic acid which acid has at least three carboxylic acid groups with an hydroxyl group of a fatty acid ester containing at least two alcoholic hydroxyl groups including at least one in the fatty acid chain, said adduct containing at least one —COOH group deriving from said anhydride group, and an ester linkage at said hydroxyl group of the fatty acid chain, said ester linkage also deriving from said anhydride group.

2. A water-soluble salt of the product of claim 1 with tertiary amine.

3. A water-soluble salt of the product of claim 1 with triethyl amine.

4. A water-soluble ester of the product of claim 1 with material selected from the group consisting of ethylene oxide, propylene oxide, mixtures of ethylene and propylene oxide, polyethylene glycol, polypropylene glycol, and polyglycols of mixtures of ethylene and propylene oxides.

5. Insoluble infusible heat-reacted products resulting from curing the product of claim 1.

6. The adduct of the anhydride group of trimellitic anhydride with an hydroxyl group in a fatty acid chain of castor oil.

7. A water-soluble salt of the product of claim 6 with tertiary amine.

8. A water-soluble salt of the product of claim 6 with triethylamine.

9. A water-soluble ester of the product of claim 6 with material selected from the group consisting of ethylene oxide, propylene oxide, mixtures of ethylene and propylene oxide, polyethylene glycol, polypropylene glycol, and polyglycols of mixtures of ethylene and propylene oxides.

10. The adduct of 0.75 mole of pyromellitic dianhydride and 1 mole of castor oil.

11. The polyethylene glycol (M.W. 400) ester of castor oil tris trimellitate.

12. A salt of triethylamine with an adduct selected from the group consisting of (1) the adduct of castor oil and trimellitic anhydride, (2) the adduct of glyceryl monoricinoleate with trimellitic anhydride, and (3) the adduct of pentaerythrityl tetraricinoleate with trimellitic anhydride.

13. A salt of (dimethylaminomethyl)phenol with the ester of polyethylene glycol (M.W. 600) with the adduct of castor oil and pyromellitic anhydride, said adduct having two carboxylic acid groups for esterification by said glycol.

14. The adduct of each anhydride group of an anhydride of an aromatic polybasic acid which acid has at least three carboxylic acid groups with an hydroxyl group of a fatty acid chain of a glyceryl ester of ricinoleic acid, said adduct containing two —COOH groups including one such group deriving from an anhydride group.

15. A water-soluble salt of the product of claim 14 with tertiary amine.

16. A water-soluble salt of the product of claim 14 with triethylamine.

17. A water-soluble ester of the product of claim 14 with material selected from the group consisting of ethylene oxide, propylene oxide, mixtures of ethylene and propylene oxide, polyethylene glycol, polypropylene glycol, and polyglycols of mixtures of ethylene and propylene oxides.

18. Insoluble infusible heat-reacted products resulting from curing the dried solids of an aqueous solution of the product of claim 17.

19. The method comprising forming an adduct by heating a mass containing as the essential ingredients adducting quantities of a fatty acid ester containing at least two alcoholic hydroxyl groups including at least one in the fatty acid chain, and an anhydride of an aromatic polybasic acid having at least three carboxylic acid groups, said adducting quantities providing at least one hydroxyl group in the fatty acid ester for adduction with each anhydride group, whereby upon adduction one carboxyl group of said anhydride group converts to a carboxylic acid group, and whereby the second carboxyl group forms an ester with said fatty acid chain, and arresting the process by cooling the mass when the acid number of the mass is reduced by the theoretical amount corresponding to the extent of adduction which is possible based upon the amounts and kinds of fatty acid ester and anhydride initially provided.

References Cited in the file of this patent
UNITED STATES PATENTS

| | | |
|---|---|---|
| 2,623,056 | Elwell | Dec. 23, 1952 |
| 2,681,322 | Auer | June 15, 1954 |
| 2,681,894 | Hoenel | June 22, 1954 |
| 2,691,004 | Doyle | Oct. 5, 1954 |
| 2,768,153 | Shokal | Oct. 23, 1956 |
| 2,853,459 | Christenson et al. | Sept. 23, 1958 |
| 2,865,871 | Johnson et al. | Dec. 23, 1958 |